March 11, 1952 W. H. ERIKSON 2,588,915

MEANS FOR OBTAINING PREDETERMINED
PHASE SHIFT CHARACTERISTICS
Filed Dec. 22, 1949

INVENTOR.
WALTER H. ERIKSON
BY
J. L. Bowes
ATTORNEY

Patented Mar. 11, 1952 2,588,915

UNITED STATES PATENT OFFICE 2,588,915

MEANS FOR OBTAINING PREDETERMINED PHASE SHIFT CHARACTERISTICS

Walter H. Erikson, Rochester, N. Y., assignor to Stromberg-Carlson Company, a corporation of New York Application December 22, 1949, Serial No. 134,491

6 Claims. (Cl. 179—100.1)

Figure 1A:
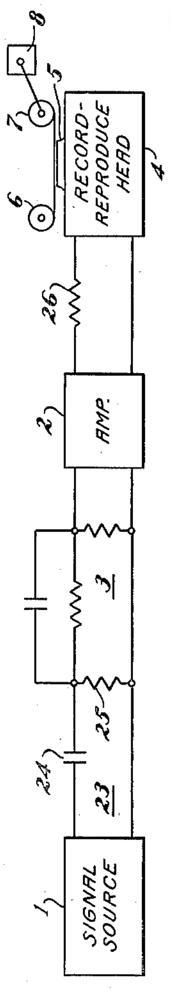

This invention relates to means for obtaining desired phase shift characteristics and more particularly to means for introducing a phase shift characteristic in order to compensate for undesired phase shift characteristics.

Any electrical system in which the waveform of the output voltage is an exact replica of the input, may be said to provide distortionless transmission. Such transmission requires not only that there be no relative attenuation of the frequency components under consideration as a result of transmission and that there be no new frequency components introduced as a result of transmission, but also that there be no change in the time relationship of the frequency components as a result of transmission. The last-mentioned consideration dictates that all components be delayed by an equal time during transmission which is equivalent to specifying that the phase characteristic of the system be proportional to frequency, passing through zero degrees at zero cycles per second.

It has been proposed heretofore to utilize recording, re-recording in reverse, and finally reproduction in the original direction in order to compensate for phase distortion arising from the components employed in the recording and reproducing channels. In some instances, however, the source of phase distortion is a device or means incapable of accepting a reversed electrical signal. For example, if the input to a recording system includes a condenser type microphone operated at such low frequencies that serious phase errors are introduced into the input coupling circuit, previously proposed techniques cannot be employed to compensate for the resulting phase shift. In other cases, it may not be necessary to compensate for phase shift, but it may be desired to introduce phase shift which is the reverse or negative with respect to a known phase shift characteristic but with respect to which there is no known physical counterpart. The technique employing re-recording in reverse is unsuitable in some cases due to the use of two recording steps and two reproducing steps which tends to double the bockground noise power, nonlinear distortion, flutter and deviations from a flat frequency response characteristic, as compared with a similar system employing one recording step and one reproducing step.

It is an object of my invention to provide new and improved means and method for introducing phase shift of predetermined characteristics whenever desired.

It is another object of my invention to provide new and improved means and method for compensating for undesired phase shift.

Still another object of my invention is to provide new and improved means and method for compensating for undesired phase shift or for introducing desired phase shift wherein only one recording-reproducing step is required.

In accordance with my present invention, there is provided a system in which a signal to be reproduced, as for oscilloscope display and study, for example, is recorded and then the recording medium containing the recorded message or signal is moved in the reverse direction to the direction prevailing during the recording step. The output of the reverse reproducing channel is utilized in suitable reproducing apparatus or utilization circuit, such as a cathode ray oscilloscope, for example.

In one embodiment of my invention, as for example where a frequency compensating network is employed in the reproducing channel and which causes undesired phase shift, I propose to introduce a compensating network in the recording channel using the same or equivalent elements to those employed in the frequency equalizing network. Moreover, I contemplate providing equivalent means for compensating for phase shift between the flux and the recording current or the open circuit output voltage of a magnetic recording and reproducing head, respectively. Where desired, the same electrical components can be used for these purposes by utilizing suitable switching means.

Further objects and advantages will become apparent as the following description proceeds. For a better understanding of my invention reference is made to the following description and to the accompanying drawings in which Fig. 1 illustrates in block diagram form a system for anticipating, i. e., precompensating for phase distortion in a recording-reproducing system, and Fig. 2 is a further embodiment of the principles of my invention in which the electrical components of a recording system may be re-arranged by suitable switching means to provide a reproducing system wherein the reproduced signal is passed through the same components as provided in the recording channel whereby phase shift is completely compensated.

Figure 1B:
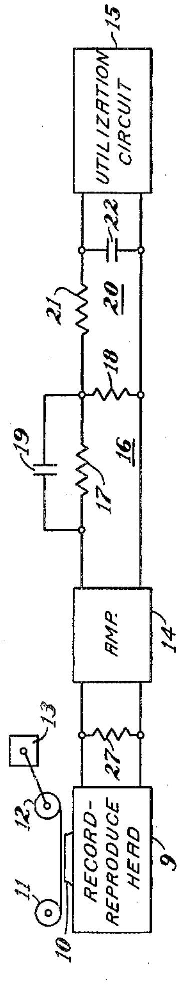
Figure 2:
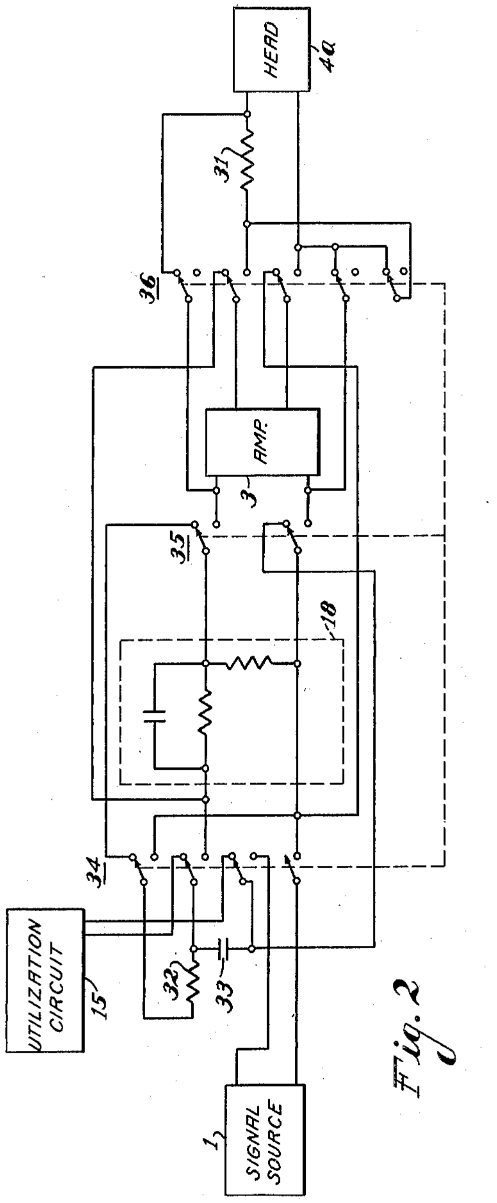

Referring to Fig. 1 there is shown a recording and reproducing system arranged to compensate for phase errors arising in various coupling and equalizing circuits. In Fig. 1A, numeral 1 indicates a source of signal. The signal input may be amplified in a suitable amplifier 2 after high frequency equalization in network 3 and then may be suitably recorded in suitable recording apparatus 4. The type of recorder forms no part of my present invention and any suitable recording method may be followed, but I prefer to employ a magnetic recorder including a recording head indicated by the numeral 5. Associated with head 5 are storage reel 6, takeup reel 7 and suitable motor 8 for driving the takeup reel 7 in order to move a suitable magnetic medium from the storage reel 6 to the takeup reel 7. In Fig. 1B there is illustrated in block form a reproducing channel including a suitable reproducer 9 which may include a magnetic recording head 10, storage reel 11, takeup reel 12, and suitable means for imparting movement to the system as, for example, a suitable motor 13. It is understood that the medium upon which a signal has been recorded in the recording channel of Fig. 1A is transferred to reproducer 9 in the recording channel of Fig. 1B. The output of reproducer 9 may be suitably amplified in a suitable amplifier 14 and then conducted to a suitable utilization device 15 such as a cathode ray oscilloscope.

Frequency response equalization can be provided in the reproducing channel as well as in the recording channel as indicated by numeral 16 without introducing any phase distortion. There is illustrated in each channel of Fig. 1 an equalizing network including series resistor 17, shunt resistor 18, and suitable capacitor 19 connected in shunt with resistor 17. Since the equalizing network is used in both the recording and the reversed reproduction channels, any phase distortion is canceled and yet the required frequency response correction is obtained.

In addition, in Fig. 1B there is illustrated a low frequency equalizing network 20 comprising a series connected resistor 21 and a shunt connected capacitor 22 between high frequency equalizing network 16 and utilization circuit 15. I have found that low frequency equalization results in a certain amount of phase distortion. I have found that such phase distortion may be compensated by including a pre-compensating network 23 in the recording channel at a suitable location as, for example, between signal source 1 and frequency equalizing network 3. I have found that a suitable network comprises a series capacitor 24 and a shunt resistor 25 connected as shown.

If the speed of the recording process in recording channel 1A is the same as the reproducing speed in reproducing channel 1B, the time constants of networks 20 and 23, i. e., the product of resistance and capacity in each network, should be substantially the same for substantially complete compensation. If the recording and reproducing channel speeds are different, I have found that the time constants of the networks 20 and 23 should be inverse with respect to the speed. For example, if the reproducing speed is twice the recording speed, the time constant or R.-C. product of network 20 should be one-half that of network 23.

The use of a conventional constant-current series resistor 26 results in a phase difference between the current flowing through recorder 4 and the flux in the head 5. This phase distortion is eliminated by introducing an equal phase difference in head 10 with the shunt resistor 27. Resistors 26 and 27 should be of substantially the same value of resistance for substantially complete compensation where heads 5 and 10 have substantially the same inductance.

In Fig. 2 there is illustrated a system in which all of the components between the signal source 1 and the utilization circuit 15 are used in both recording and reproducing channels whereby complete phase shift compensation is provided. In order to permit the use of all components in both channels there is provided suitable switching means. Thus, a single resistor 31 is either connected in series with recording-reproducing head 4*a* or in shunt thereof, and there is provided a single network including resistor 32 and capacitor 33 which is connected either in the output of signal source 1 with capacitor 33 in series and resistor 32 in shunt thereof, or in the input to utilization circuit 15 with capacitor 33 in shunt thereof and resistor 32 in series therewith, depending upon the relative positions of the various switches illustrated. Switch element 34 is provided to switch equalizing network 18 between the input to amplifier 3 and the output of amplifier 3 in the recording and reproducing operations, respectively, and switch element 36 is arranged to switch resistor 31 and the connections between amplifier 3 and head 4.

With the arrangement illustrated in Fig. 2 the switching elements are illustrated in the position for reproducing. In the recording process the switch elements are moved downwardly as viewed in Fig. 4. Any suitable switching means may be employed. For example, a single manually operated switching device may be employed having the required number of contacts and armatures or a relay having the required number of contacts and armatures may be employed together with a suitable energizing circuit, for example.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. Apparatus for compensating undesired phase shift characteristics comprising a recording channel including means for moving a recording medium in a given direction, and a reproducing channel including means for moving said medium in a direction which is the reverse of said given direction, said reproducing channel being subject to phase distortion, and means in said recording channel for substantially compensating for such phase distortion.

2. Apparatus for compensating undesired phase shift characteristics comprising a recording medium; means for moving said medium in a given direction; a recording channel including a source of signal to be recorded and means for recording said signal, and a first resistance connected in series with said recording means; a reproducing channel including means for moving said medium in a direction which is the reverse of said given direction, means for reproducing said signal during said reversed movement, means for providing low frequency compensation in said reproducing channel including resistance in series and capacitance in shunt with said reproducing channel, and a second resistance shunting the output of said reproducing means in order to compensate for phase shift caused by said first resistance; and means in said recording channel for compensating the phase shift caused by said low frequency compensation including capacitance in series and resistance in shunt with said recording channel.

3. Apparatus for compensating undesired phase shift characteristics comprising a recording medium; means for moving said medium in a given direction; a recording channel including a source of signal to be recorded and means for recording said signal, and a first resistance connected in series with said recording means; a reproducing channel including means for moving said medium in a direction which is the reverse of said given direction, means for reproducing said signal during said reversed movement, means for providing low frequency compensation in said reproducing channel including resistance in series and capacitance in shunt with said reproducing channel, and a utilization circuit; a second resistance shunting the output of said reproducing means in order to compensate for phase shift caused by said first resistance; and means in said recording channel for compensating the phase shift caused by said low frequency compensation including capacitance in series and resistance in shunt with said recording channel, the time constants of the low frequency compensating circuit and the phase shift compensating means being substantially the same.

4. Apparatus for compensating undesired phase shift characteristics comprising a recording medium; means for moving said medium in a given direction; a recording channel including a source of signal to be recorded and means for recording said signal, and a first resistance connected in series with said recording means; a reproducing channel including means for moving said medium in a direction which is the reverse of said given direction, means for reproducing said signal during said reversed movement, means for providing low frequency compensation in said reproducing channel including resistance in series and capacitance in shunt with said reproducing channel, and a utilization circuit; a second resistance shunting the output of said reproducing means in order to compensate for phase shift caused by said first resistance means; and means in said recording channel for compensating for the phase shift caused by said low frequency compensation including capacitance in series and resistance in shunt with said recording channel, the time constants of said low frequency compensation network and said phase shift compensating means being inversely proportional to the relative speeds of said medium during the recording and reproducing steps.

5. Apparatus for compensating undesired phase shift characteristics comprising a recording medium; means for moving said medium in a given direction; a recording channel including a source of signal to be recorded and means for recording said signal, and a first resistance connected in series with said recording means; a reproducing channel including means for moving said medium in a direction which is the reverse of said given direction, means for reproducing said signal during said reversed movement, means for providing low frequency compensation in said reproducing channel including resistance in series and capacitance in shunt with said reproducing channel, and a utilization circuit; a second resistance shunting the output of said reproducing means in order to compensate for phase shift caused by said first resistance means; and means in said recording channel for compensating for the phase shift caused by said low frequency compensation including capacitance in series and resistance in shunt with said recording channel, said resistances being of substantially the same value of resistance.

6. Apparatus for compensating undesired phase shift characteristics comprising a recording medium; means for moving said medium in a given direction; a recording channel including a source of signal, a recording-reproducing device, and a first resistor connected in series with said recording-reproducing device; a reproducing channel including means for moving said medium in a direction which is the reverse of said given direction, said recording-reproducing device, a second resistor in series with said reproducing channel and a capacitor in shunt therewith, and a utilization circuit; and switching means for inserting said second resistor in shunt with and said capacitor in series with said signal source in the recording process, and for inserting said first resistor in shunt with said device in the reproducing process whereby substantial compensation for phase distortion is provided.

WALTER H. ERIKSON.

REFERENCES CITED

The following references are of record in the file of this patent:

UNITED STATES PATENTS

| Number | Name | Date |
|---|---|---|
| 1,870,778 | Lang | Aug. 9, 1932 |
| 1,892,935 | De Forest | Jan. 3, 1933 |
| 1,940,282 | Wolfe | Dec. 19, 1933 |
| 2,008,699 | Hammond | July 23, 1935 |
| 2,253,186 | Loye | Aug. 19, 1941 |
| 2,300,239 | Thiede | Oct. 27, 1942 |
| 2,446,479 | Begun | Aug. 3, 1948 |
| 2,466,186 | Thompson | Apr. 5, 1949 |
| 2,471,251 | Tompkins | May 24, 1949 |
| 2,511,606 | Tompkins | June 13, 1950 |